(12) United States Patent
Tinglow et al.

(10) Patent No.: US 8,654,495 B2
(45) Date of Patent: Feb. 18, 2014

(54) BATTERY ENERGY STORAGE SYSTEM WITH SHORT CIRCUIT PROTECTION, AND METHOD

(75) Inventors: Fredrik Tinglow, Arboga (SE); Jan Svensson, Vasteras (SE); Magnus Backman, Vasteras (SE); Willy Hermansson, Vasteras (SE); Falah Hosini, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/530,177

(22) Filed: Jun. 22, 2012

(65) Prior Publication Data
US 2012/0274142 A1 Nov. 1, 2012

Related U.S. Application Data

(63) Continuation of application No. PCT/EP2009/067764, filed on Dec. 22, 2009.

(51) Int. Cl.
*H02H 3/20* (2006.01)
(52) U.S. Cl.
USPC ........................................ 361/93.1; 361/91.1
(58) Field of Classification Search
USPC ......................................... 361/54, 91.1, 93.1
See application file for complete search history.

(56) References Cited

U.S. PATENT DOCUMENTS

| 5,773,962 | A | 6/1998 | Nor | |
| 7,557,585 | B2* | 7/2009 | Yudahira | 324/433 |
| 8,198,835 | B2* | 6/2012 | Yokoyama et al. | 318/139 |
| 2009/0310270 | A1 | 12/2009 | Burns et al. | |
| 2010/0079108 | A1* | 4/2010 | Monden et al. | 320/116 |

FOREIGN PATENT DOCUMENTS

WO 2008002223 A1 1/2008

OTHER PUBLICATIONS

International Preliminary Report on Patentability; Application No. PCT/EP2009/067764; Issued: Feb. 27, 2012; 10 pages.
International Search Report & Written Opinion of the International Searching Authority; Application No. PCT/EP2009/067764; Issued Sep. 16, 2010; Mailing Date: Sep. 27, 2010; 8 pages.

* cited by examiner

*Primary Examiner* — Danny Nguyen
(74) *Attorney, Agent, or Firm* — St. Onge Steward Johnston & Reens LLC

(57) ABSTRACT

A battery energy storage system including a control unit and a plurality of battery units. The battery units are arranged in series, and each battery unit includes a semiconductor switch and a battery module including a plurality of battery cells. Each battery module is connected in series with a respective semiconductor switch, and the control unit is operatively connected to the semiconductor switch and adapted to control the semiconductor switch of every battery unit.

13 Claims, 3 Drawing Sheets

BATTERY ENERGY STORAGE SYSTEM WITH SHORT CIRCUIT PROTECTION, AND METHOD

CROSS-REFERENCE TO RELATED APPLICATIONS

The present application is a continuation of pending International patent application PCT/EP2009/067764 filed on Dec. 22, 2009 which designates the United States and the content of which is incorporated herein by reference.

FIELD OF THE INVENTION

The invention relates generally to the field of electric power transmission systems, and in particular to battery storages for use in such power systems. By electric power transmission systems is meant a distribution system of at least 3 kV, preferably at least 10 kV.

BACKGROUND OF THE INVENTION

Electric power systems need to provide electric power in a reliable fashion. Therefore such systems often comprise backup devices, for example in form of DC power sources. The backup devices may provide power for evening out fluctuations, shortages etc.

An example of such a device, usable as a backup, is a battery energy storage as illustrated in FIG. 3. The battery energy storage 10 comprises a number of series- and/or parallel-connected battery cells arranged in battery modules 20. The battery modules 20 in turn are series- and/or parallel-connected to form a battery unit 30 and several battery units 30 may be series-connected to form a battery string 40. In large battery energy storage systems, several such battery strings 40 are connected in parallel between negative and positive busbars. The battery strings 40 are connected to a load, for example a converter system 50, which in turn is connected to a power network transmission system. Circuit breakers 60 may further be arranged between each battery string and the respective DC busbars.

WO2008/002223 A1 describes a power compensator (see abstract) for an AC electric power transmission. The power compensator comprises a voltage source converter (4 in the figure) connected to a capacitor means (6) in parallel with a DC energy storage device (5). The energy storage device (5) comprises a high voltage battery means, including a battery string, having a short circuit failure mode, a first (40a) switch and a second switch (40b) for disconnecting the battery string, and a control unit (44) for operating these switches (40a, 40b).

A drawback with these short circuit protection switches is that they have to be dimensioned for high voltage, including large space requirements, and must be able to break very large short circuit currents.

SUMMARY OF THE INVENTION

It is an object of the invention to overcome or at least alleviate the above-mentioned problems. In particular, it is an object of the invention to provide improved means for short circuit protection of battery units in energy storage systems.

These objects, among others, are achieved by a battery energy storage system.

In accordance with the invention, a battery energy storage system is provided comprising strings of battery units in series. Each battery unit comprises at least one battery module including a plurality of battery cells and a semiconductor switch, which battery module is connected in series with the semiconductor switch. The storage system includes a control unit that controls the semiconductor switch, so that large currents, for example from short circuits, are prevented from damaging the battery cells of the battery module. Thus, each battery module is protected by its semiconductor switch.

A large battery energy storage comprises many battery units and these battery units in turn comprise one or preferably more than one battery module, each battery module electrically connected in a serial circuit with a semiconductor switch, and wherein the battery module circuits preferably are electrically connected in parallel. The system includes at least one control unit that manage each battery unit, and the semiconductor switch of each battery module of the battery unit.

The system makes it possible to turn off internal short circuit currents of a battery string, each semiconductor switch disconnects only one battery module, and every battery module is directly connected in series with its own semiconductor switch without any battery modules in-between.

The battery unit preferably includes a battery control unit for controlling the semiconductor switch of every battery module.

In an embodiment, the battery unit includes a plurality of battery modules arranged in parallel and each semiconductor switch is controlled by the system to protect each battery module.

In an embodiment the battery units are arranged in battery stacks, wherein a plurality of battery units are connected in series.

Preferably the battery stack includes a stack controller that controls the battery units so that disconnection of the battery modules of the stack is synchronised. In this way all battery modules of the stack are disconnected simultaneously. In another preferred embodiment, a simultaneous disconnection of the battery modules of a stack is controlled by the battery control units of the battery units, wherein the battery control units are adapted to instruct the other battery control units to disconnect their modules when the battery unit disconnects its own battery modules.

In an embodiment, the energy storage system further comprises a system controller connected to the battery control unit and the system controller is arranged and adapted to control the energy storage system, including balancing the state-of charge of the battery units by controlling the current from the different battery units, and monitoring the overall functioning of the energy storage system, for example by being adapted to control the system alone or in combination with the battery control units and stack control units.

In an embodiment each semiconductor switch of the battery modules comprises a MOSFET transistor for the switching. Preferably, the semiconductor switch also includes a diode arranged in parallel with the MOSFET. The diode and MOSFET are arranged in opposite directions so that the diode is arranged to conduct during charging only, and the MOSFET is arranged only to conduct during discharging. Thus, the diode is used to charge the battery cells of the battery modules with excessive power from a transmission system to which the energy storage is connected, such as to the DC side of a voltage source converter.

In an embodiment the control unit, i.e. the system controller, the stack controller or, preferably, the battery control unit, includes means for monitoring the current, such as a current measuring unit, through each battery module, and is adapted to instruct the semiconductor switch to disconnect the battery module if the current is above a short circuit threshold.

By disconnecting the battery module when the current is too large, the other battery cells of the string or other strings are protected from the malfunctioning battery module, and also the battery modules can be protected from harmful current levels originating from the voltage source converter, or transmission system, to which the energy storage is connected.

In an embodiment each of the battery control units are adapted to measure the voltage of and/or current through each battery module circuit, e.g. semiconductor switch and/or battery module. The battery units can preferably be provided with switches for disconnecting the whole battery unit from the next battery unit in the series of battery units, when the current or voltage is too large. The battery control unit or the stack controller can be arranged and adapted to provide the disconnection of these switches.

In an embodiment each stack controller is adapted to measure the current in, and voltage over, each battery stack. Each battery stack is preferably provided with switches for disconnecting it from other battery stacks. These switches can be controlled by the battery stack controller when current or voltage of the stack is too large.

In an embodiment, each battery stack provides DC voltage at 1-10 kV, preferably between 2 and 5 kV or approximately 3 kV, and the string includes at least two stacks. The system can be dimensioned for voltages of between 10 kV and 100 kV, or even more than 100 kV. In an embodiment each battery unit provides between 50 and 1000 volts, such as more than 100 volts and/or lower than 500 volts, especially between 150 and 350 volts or approximately 250 volts. Twelve 250-volt battery units create a stack of 3 kV. Each stack includes preferably more than three battery units, such as more than five or seven units, or more than ten units, such as twelve battery units or more.

The switches are preferably MOSFET or IGBT (Insulated Gate Bipolar Transistor) switches. MOSFET switches are suitable for voltages up to 1000 volt, whereas IGBT switches are suitable above 1000 volts. IGBT switches can be used for voltages below 1000 volts as well, especially, IGBT switches are suitable for voltage levels above 200 volts. In an embodiment MOSFET switches are used, preferably in the battery units providing between 50 and 1000 volts. In an alternative embodiment IGBT switches are used, preferably in battery units providing more than 50 volts, especially more than 200 volts.

Also, in an embodiment the system control unit has means for and is adapted to monitor and measure the currents in each string and/or the voltages across each string of the storage. The strings are connected to DC buses by means of switches and the system controller can be adapted to control these switches to provide disconnection of a whole string when currents and/or voltage is too large for the string.

DETAILED DESCRIPTION OF THE INVENTION

Figure 1:
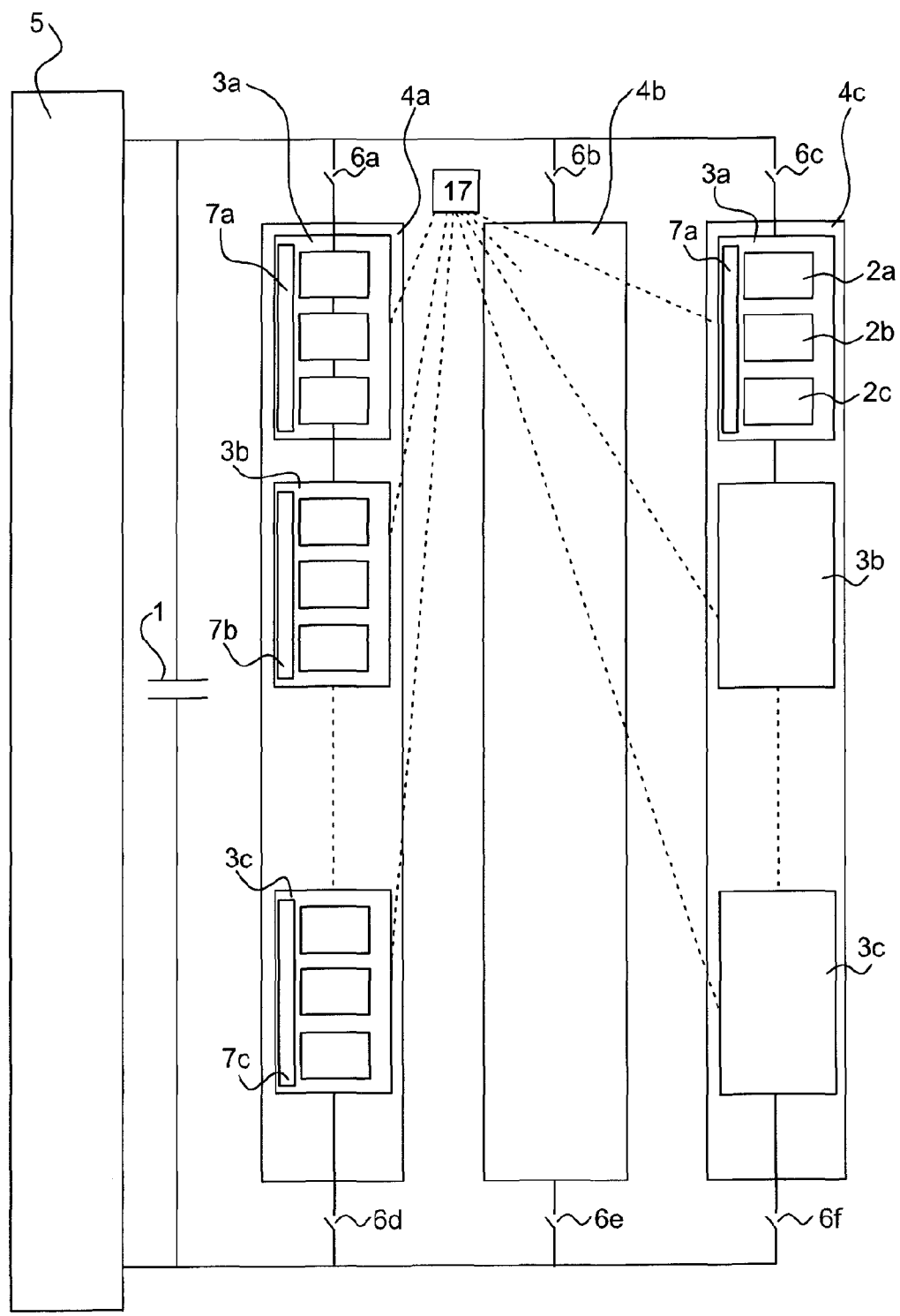
FIG. 1 illustrates a battery energy storage system in accordance with the invention.

The same reference numerals are used throughout the description for denoting same or similar parts.

FIG. 1 illustrates an apparatus for providing power to an AC power transmission system. It includes a capacitor 1 in parallel with a high voltage DC power source 2-4, 6, 7 connected to the DC side of a voltage source converter 5. The voltage source converter 5 is connected on its other side to an AC high voltage power transmission system (not illustrated). The DC power source comprises an energy storage system having a plurality of parallel strings 4a-c, and each string comprises battery stacks 3a-c connected in series. Each string 4a-c is connected to the voltage source converter 5 by common bus bars via a first and second disconnector 6a-f, so that the whole energy storage string can be selectively connected and disconnected from the common DC buses and the voltage source converter 5. Each battery stack 3a-c comprises a stack of battery units 2a-c in series and a stack controller 7a-c. The stack controller 7a-c is in turn connected to a common system or main control unit 17. The number of battery stacks 3a-c in each string is chosen to create the desired voltage level.

Figure 2:
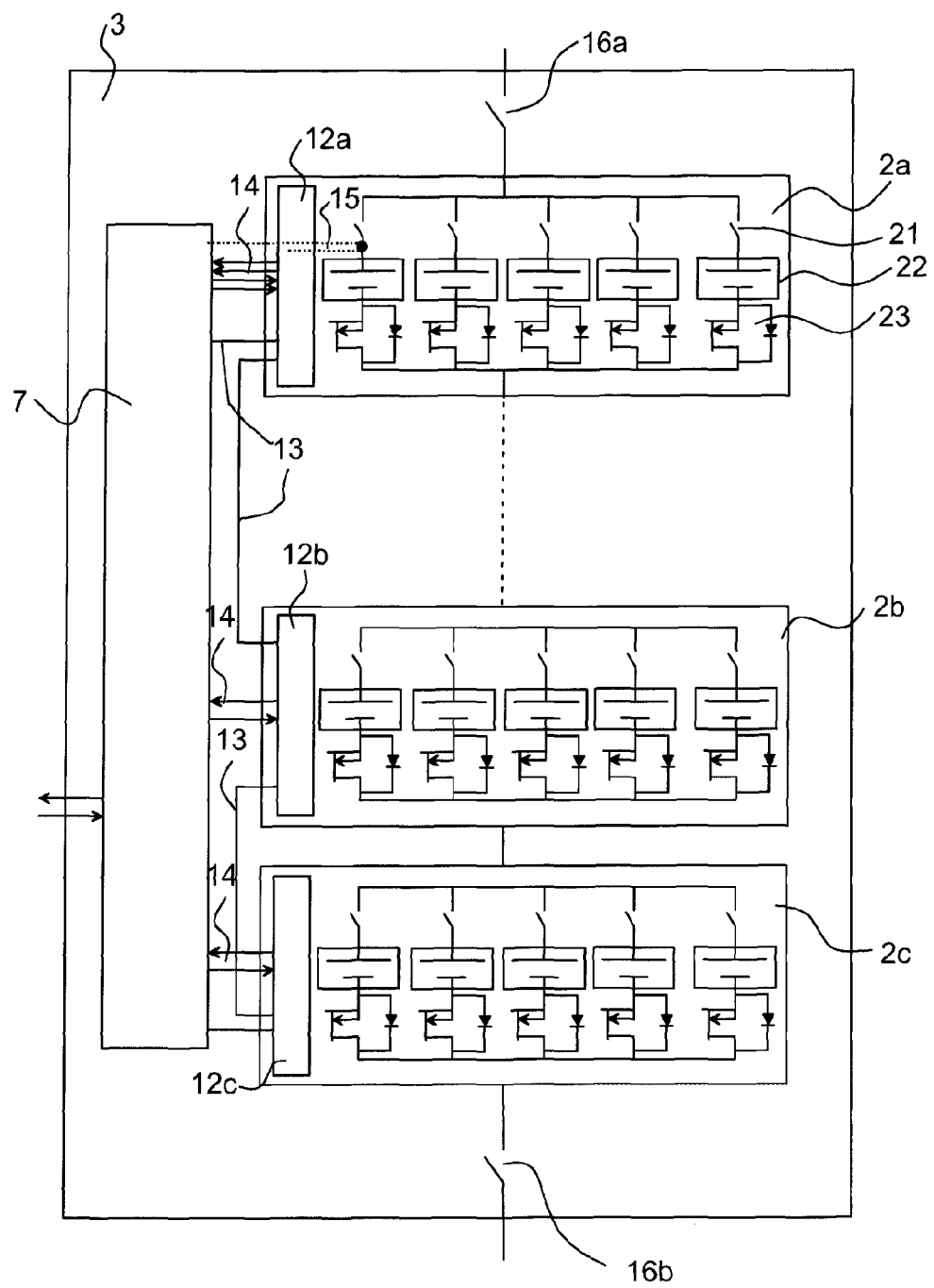
FIG. 2 illustrates a battery stack of a battery energy storage system in accordance with the invention.
Figure 3:
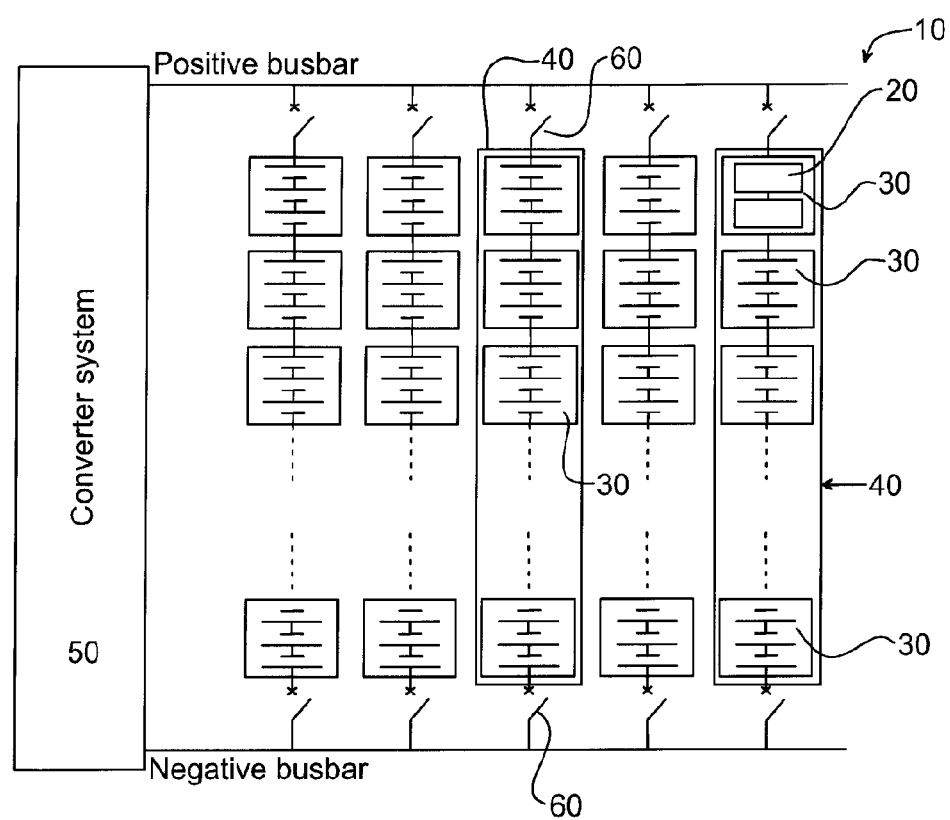
FIG. 3 illustrates a prior art system.

FIG. 2 illustrates the battery stacks (3a-c in FIG. 1) in more detail. Every battery stack 3 includes serially interconnected battery units 2a-c in a stack configuration, and a stack controller 7. The battery stack 3 is connected to a first and a second disconnector 16a-b for selectively connecting the battery stack to other battery stacks, one disconnector in each end. Each battery unit 2a-c includes a battery control unit 12a-c and parallel circuits, wherein each parallel circuit includes a battery module 22, with a plurality of battery cells, in serial connection with a semiconductor switch 23. Each battery module 22 is connected to its own semiconductor switch 23. In general, each battery unit 2 comprises at least one such circuit consisting essentially of a battery module 22 in series with a semiconductor switch. The semiconductor switch includes a MOSFET that is arranged in parallel with a diode. The MOSFET and diode are arranged in opposite directions, i.e. the MOSFET is arranged to conduct only during discharging, while the diode only conducts during charging. The battery control units 12a-c controls the MOSFETS of every parallel circuit. The battery control units 12a-c are preferably daisy chained in a communication link 13, so that they are communicatively connected to each other. Each battery control units is also preferably directly connected to the stack controller 7 in a communication link 14. The stack controller 7 is suitably adapted to synchronise the switching of all semiconductor switches 23 in the battery stack 3. When disconnecting a malfunctioning battery module 22, the battery control unit 12a-c is suitably adapted to instruct the other battery control units 12a-c of the communication link 13 to disconnect their respective battery modules 22, so that all battery modules 22 of the stack 3 are disconnected. Each battery module 2 also includes a mechanical breaker 21 for disconnecting the battery module. The breaker 21 is arranged in series with the cell on the opposite side to the semiconductor switch.

The stack controllers 7a-c of every battery stack 3a-c of a string is connected to a system control unit 17, which suitably is adapted to synchronise the stack controllers 7a-c to disconnect simultaneously so that all the battery modules of the string are disconnected.

Among other things, the battery control unit 12a-c, and/or the other control units (7, 17), can be arranged to, and adapted for, measuring and controlling the battery stacks and for this purpose be provided with means for measuring different parameters such as battery currents, cell- and battery voltages, temperature, battery state-of-charge, and performing cell balancing. Also, the battery control units 12a-c can be adapted to handle communication between battery stacks 3a-c and handle communication in order to send and receive data from the stack controller 7 and the system controller 17.

What is claimed is:

1. An energy storage system comprising:
a control unit;
a battery stack including a plurality of battery units, the battery units electrically connected in series, and each battery unit having at least one semiconductor switch and at least one battery module including a plurality of battery cells;
wherein each battery module is connected in series with a respective semiconductor switch, and the control unit is operatively connected to the at least one semiconductor switch and adapted to control the at least one semiconductor switch of every battery unit;
wherein the control unit includes a current monitor for monitoring the current through each battery module of at least one battery unit, and disconnects the battery module if the monitored current is above a short circuit threshold;
wherein the control unit disconnects the battery cell by activating the semiconductor switch; and
wherein the control unit disconnects all battery modules of every battery unit of the battery stack simultaneously.

2. The energy storage system as claimed in claim 1, wherein each battery unit comprises a plurality of battery modules, each including a plurality of battery cell and being connected in series with a respective semiconductor switch, and
wherein each battery module and semiconductor switch connected in parallel with the other serial circuits of battery modules and semiconductor switches of the battery unit.

3. The energy storage system as claimed in claim 1, wherein each battery unit includes a battery control unit for controlling the semiconductor switches.

4. The energy storage system as claimed in claim 1, wherein each battery unit of the stack comprises a battery control unit operatively connected to the semiconductor switches of the battery modules of the battery unit.

5. The energy storage system as claimed in claim 1, wherein the stack includes a stack control unit being operatively connected to the battery units of a battery stack.

6. The energy storage system as claimed in claim 5, wherein the stack control unit is adapted to synchronise the control of the semiconductor switches of the battery units of the battery stack.

7. The energy storage system of claim 1,
wherein a plurality of stacks are arranged in series in a string of serially interconnected stacks of battery units,
wherein the string is arranged to provide a DC voltage input to a voltage source converter.

8. The energy storage system of claim 7, comprising a plurality of strings.

9. The energy storage system as claimed in claim 1, wherein the at least one semiconductor switch comprises a MOSFET.

10. The energy storage system as claimed in claim 1, wherein the at least one semiconductor switch comprises an IGBT connected in parallel with a diode.

11. The energy storage system in claim 9, wherein the MOSFET is arranged to conduct current only during discharge of energy from the battery module.

12. The energy storage system in claim 10, wherein the IGBT is arranged to conduct current only during discharge of energy from the battery module, whereas the diode is arranged to conduct only during charging of the battery module.

13. A method for controlling an energy storage system comprising a control unit, a battery stack including a plurality of battery units, the battery units being arranged in series, and each battery unit having at least one semiconductor switch and at least one battery module including a plurality of battery cells, wherein each battery module is electrically connected in series with a respective semiconductor switch, and the control unit is operatively connected to the at least one semiconductor switch and adapted to control the at least one semiconductor switch of every battery unit, wherein the control unit includes a current monitor for monitoring the current through each battery module of at least one battery unit, and disconnects the battery module if the monitored current is above a short circuit threshold, and wherein the control unit disconnects the battery cell by activating the semiconductor switch, wherein the control unit disconnects all battery modules of every battery unit of the battery stack simultaneously, characterized by the steps of:
monitoring a current through each battery module,
instructing the semiconductor of all switches of every battery unit to simultaneously turn off, in the event that the current exceeds a first threshold.

* * * * *